United States Patent Office 3,210,433
Patented Oct. 5, 1965

3,210,433
PREPARATION OF SUBSTITUTED INDENES
Sheldon Chibnik, Plainfield, N.J., assignor to Socony Mobil Oil Company, Inc., a corporation of New York
No Drawing. Filed Dec. 31, 1962, Ser. No. 248,288
4 Claims. (Cl. 260—668)

This invention relates to the preparation of indene derivatives. It is more particularly concerned with a catalytic process for converting substituted phenyl propanediols into substituted indenes.

As is well known to those familiar with the art various methods have been proposed to prepare indene derivatives. One method involves the dehydration of pinacols. Presently known processes for dehydrating pinacols, however, have been disadvantageous, because they involve the use of relatively expensive reactants, or involve the use of high temperatures and prolonged periods of time. The desirability of a relatively rapid process for carrying out the dehydration, that is adaptable to continuous processing, will be readily appreciated.

Accordingly, it is a broad object of this invention to provide a process for producing substituted indenes. Another object is to provide a process for dehydrating pinacols to substituted indenes. A specific object is to provide a catalytic method for converting pinacols into substituted indenes. Other objects and advantages of this invention will become apparent to those skilled in the art, from the following detailed description.

The present invention provides a method for producing substituted indenes that comprises contacting a compound having the formula:

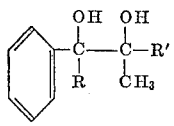

wherein R is hydrogen or a lower alkyl radical and R' is an aromatic hydrocarbon group, with a refractory oxide catalyst, at a temperature of between about 650° F. and about 1000° F., and at a liquid hourly space velocity of between about 0.1 and about 500.

The reactants that are dehydrated to an indene, in accordance with this invention, are compounds having the formula:

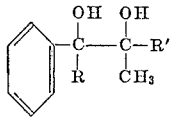

wherein R is hydrogen or a lower alkyl radical and R' is an aromatic hydrocarbon group. Except in the case wherein R is hydrogen, these compounds are pinacols. They are readily prepared by methods well known to those skilled in the art. Non-limiting examples of these compounds are 2,3-diphenyl-2,3-butanediol; 2-phenyl-2-naphthyl-2,3-butanediol; 1,2-diphenyl-1,2-propanediol; 1-phenyl - 2-propylphenyl - 1,2-propanediol; 1-phenyl-2-naphthyl - 1,2-propanediol; 2,3-diphenyl-2,3-pentanediol; 2-propylphenyl - 3-phenyl-2,3-pentanediol; 2,3-diphenyl-2,3-hexanediol; 2-(α-methylnaphthyl)-3-phenyl-2,3-hexanediol; 2,3-diphenyl - 2,3-octanediol; and 2-xylyl-3-phenyl-2,3-octanediol.

The catalysts utilizable herein are the well-known acidic refractory oxide catalysts. Such catalysts are refractory oxides or composites of two or more refractory oxides, which are acidic in nature. Generally this group includes oxides of the metals of Groups IIA, IIIB, and IVA and B of the Periodic Arrangement of the Elements [J. Chem. Educ., 16 409 (1939)]. The catalysts can be synthetic oxides or synthetic composites of refractory oxides such as silica, alumina, silica-alumina, silica-zirconia, silica-alumina-zirconia, silica-alumna-thoria, alumina-boria, and silica-magnesia. The catalysts can also be the acid form synthetic aluminosilicates, i.e., the zeolitic molecular sieves. Naturally-occurring clays and zeolites are contemplated, such as mordenite, montmorillonite, chabazite, etc. Usually the natural clays and zeolites exist in the form of alkali or alkaline earth metal salts. Thus, in order to be effective catalysts, these materials can be acid-treated using techniques well known to those skilled in the art.

The process of this invention can be carried out at temperatures between about 650° F. and about 1000° F. Preferred temperatures, at which maximum yields are obtained, are between about 750° F. and about 850° F. The time of contact of the starting reactant with the catalyst, expressed as liquid hourly space velocity (LHSV), can vary over a wide range. A liquid hourly space velocity as low as about 0.1 and as high as about 500 or more can be used. In preferred practice, however, the LHSV will be between about 1 and about 100.

The reaction involved in the process of this invention proceeds readily at atmospheric pressure. Reduced pressure is advantageous. Accordingly, the process can be carried out at pressures of between about 1 or less and about 760 millimeters of mercury. As those skilled in the art will appreciate, conditions of temperature, contact time, and pressure can be selected to approach complete conversion of the charge into indene. It is contemplated that less than complete conversion per pass will be more economically and commercially feasible. The charge reactant, unchanged, can be recovered from the reactor effluent, so that it can be recycled to extinction.

As the process is carried out at elevated temperatures, oxygen and other reactive gases should be excluded from the reactor, in order to avoid undesirable side reactions and degradation of the charge. Thus, it is preferred to carry out the process in an atmosphere of an inert gas, such as nitrogen, flue gas, etc.

The reaction products of the process of this invention are substituted indenes having the formula:

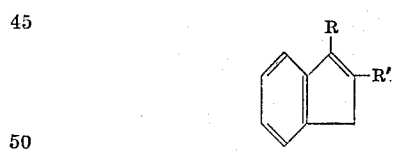

wherein R is hydrogen or a lower alkyl radical and R' is an aromatic hydrocarbon radical. Besides being utilizable as organic intermediates, these compounds can be saturated by hydrogenation to produce jet fuels having a high number of B.t.u. per pound. They can also be used as heat transfer media. At least some of the indene products can be used to produce modified resins of the coumarone-indene type.

EXAMPLES 1 THROUGH 8

A series of runs was carried out at various temperatures and contact times. In each run, 25 g. of molten 2,3-diphenyl-2,3-butanediol was passed, under a nitrogen atmosphere, through a 12" x 1.25" diameter bed of alumina (F–10) that contained about 0.1% silica by weight. The indene product, 1-methyl-2-phenylindene, was separated from the effluent by filtration. The theoretical yield of the indene is 21.5 g. The catalyst temperature, contact time, pressure and yield for each run are set forth in the table.

Table

| Example | Temp., °F. | Time, Min. | LHSV | Pressure, mm. Hg | Recovery, g. | Indene, g. | Percent Conversion, Based on Recovery |
|---|---|---|---|---|---|---|---|
| 1 | 600 | 4 | 62 | 760 | 12 | None | 0 |
| 2 | 750 | 0.5 | 500 | 7 | 19.3 | 1.4 | 8 |
| 3 | 750 | 4 | 62 | 18 | 12 | 3 | 28 |
| 4 | 750 | 4 | 62 | 18 | 20 | 6.0 | 33 |
| 5 | 750 | 4 | 62 | 86 | 21.2 | 5.6 | 30 |
| 6 | 750 | 4 | 62 | 760 | 17.5 | 3.6 | 23 |
| 7 | 750 | 30 | 8 | 8 | 14.7 | 8.4 | 61 |
| 8 | 1,000 | 4 | 62 | 760 | 17 | 1.6 | 11 |

In the table, the percent conversion based on recovery represents the amount of conversion into indene calculated on the basis of the amount of recovery and the amount of indene therein. This value does not include the amount of charge and indene product above the amount of recovery, which material is held up in the catalyst bed. Accordingly, the conversion shown, while not total conversion, reflects the order of magnitude of conversion under a given set of conditions.

From the table, it will be noted that optimum conversions took place at a temperature of about 750° F. At that temperature, higher conversion occurred at lower space velocities and under reduced pressure. The unconverted 2,3-diphenyl-2,3-butanediol can be recycled to extinction.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing substituted indenes that comprises contacting a compound having the formula:

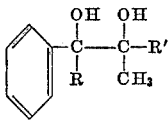

wherein R is selected from the group consisting of hydrogen and lower alkyl radicals and R', is an aromatic hydrocarbon radical, with a refractory oxide catalyst, at a temperature of between about 650° F. and about 1000° F., and at a liquid hourly space velocity of between about 0.1 and about 500.

2. A method for producing substituted indenes that comprises contacting a compound having the formula:

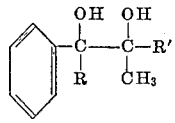

wherein R is selected from the group consisting of hydrogen and lower alkyl radicals and R' is an aromatic hydrocarbon radical, with a refractory oxide catalyst, at a temperature of between about 750° F. and about 850° F., and at a liquid hourly space velocity of between about 1 and about 100.

3. The process defined in claim 2 wherein said refractory oxide catalyst is alumina-silica.

4. A method for producing 1-methyl-2-phenylindene that comprises contacting 2,3-diphenyl-2,3-butanediol with an alumina-silica catalyst, at a temperature of between about 750° F. and about 850° F., and at a liquid hourly space velocity of between about 1 and about 100.

References Cited by the Examiner

UNITED STATES PATENTS

| | | | |
|---|---|---|---|
| 2,402,847 | 6/46 | Schmerling et al. | 260—671 |
| 2,408,167 | 9/46 | Hepp | 260—671 |
| 2,531,328 | 11/50 | Elwell | 260—668 |
| 3,082,267 | 3/63 | Hunter et al. | 260—668 |

ALPHONSO D. SULLIVAN, *Primary Examiner.*